INVENTOR
Leonard A. Young
BY Dike, Calver & Gray
ATTORNEYS.

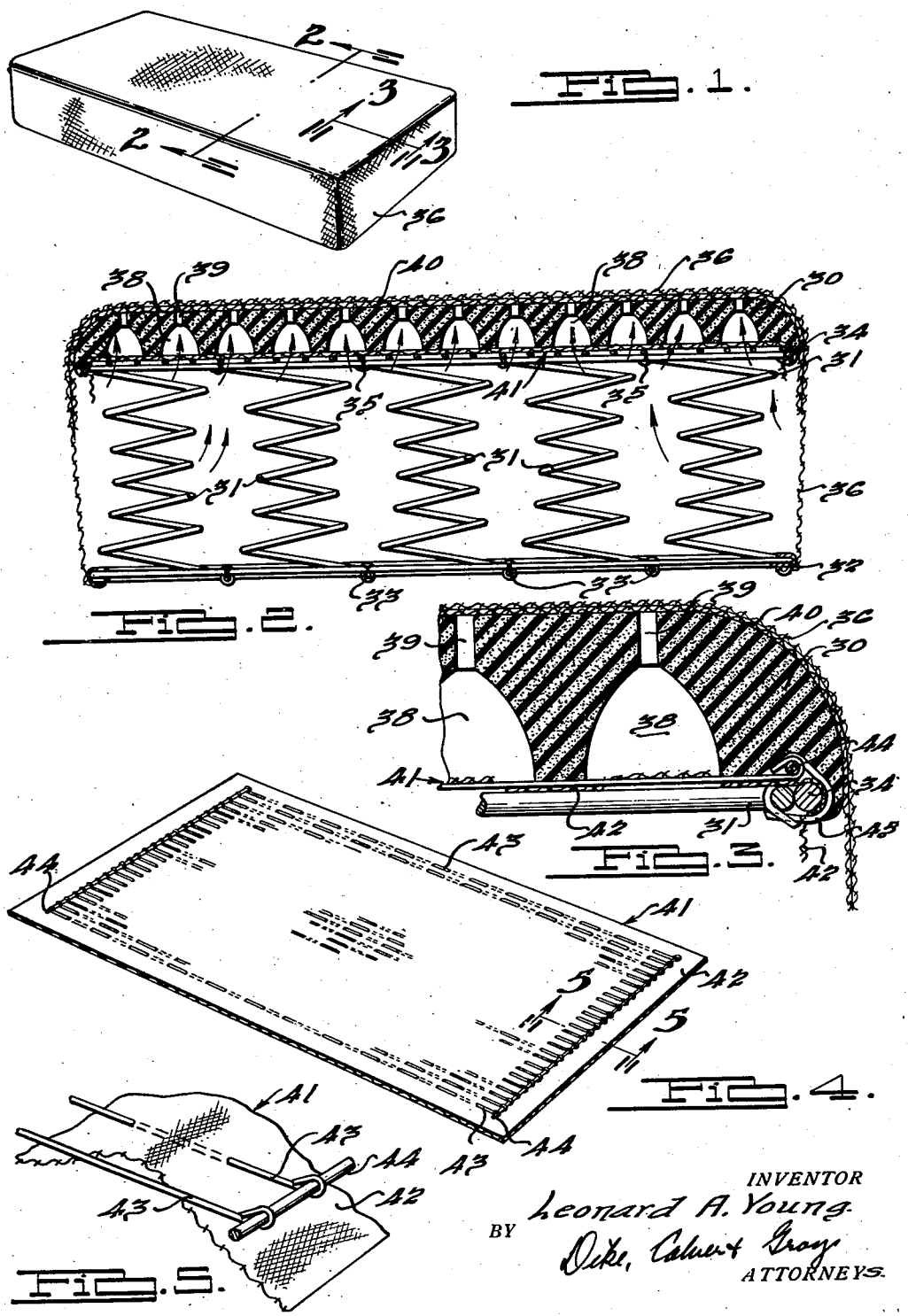

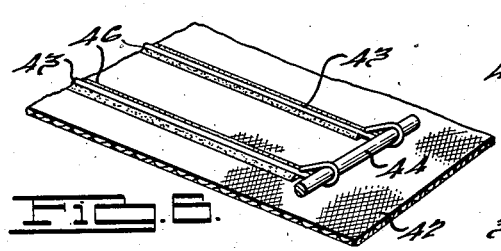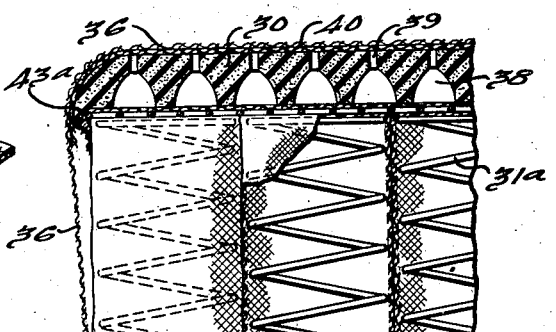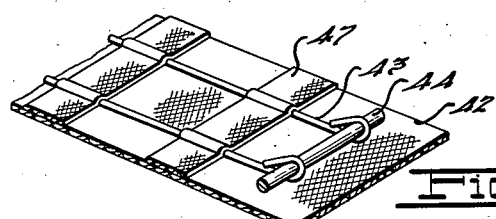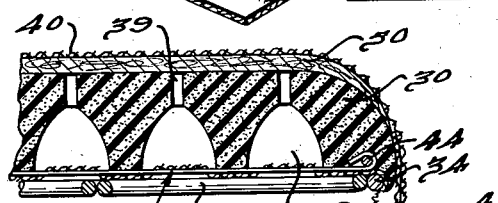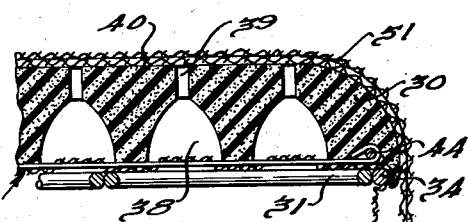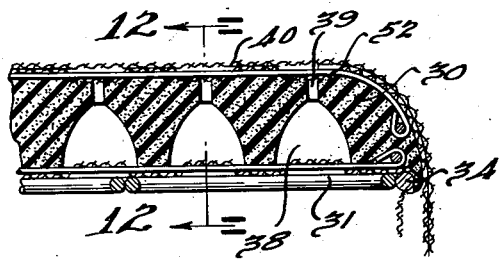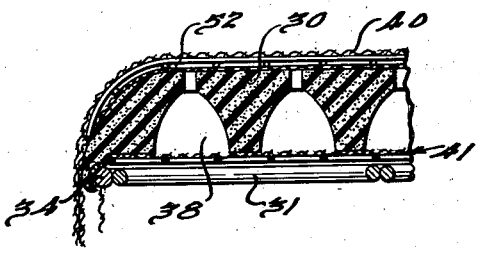

May 12, 1942.  L. A. YOUNG  2,283,116
SEAT CUSHION
Filed Dec. 4, 1939   4 Sheets-Sheet 4
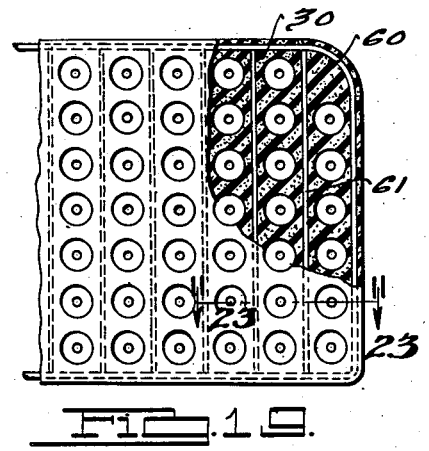
FIG. 19.
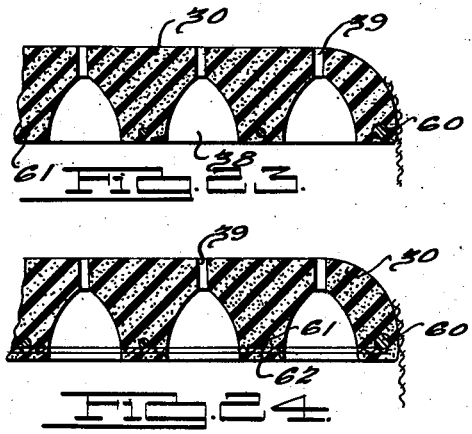
FIG. 23.
FIG. 24.
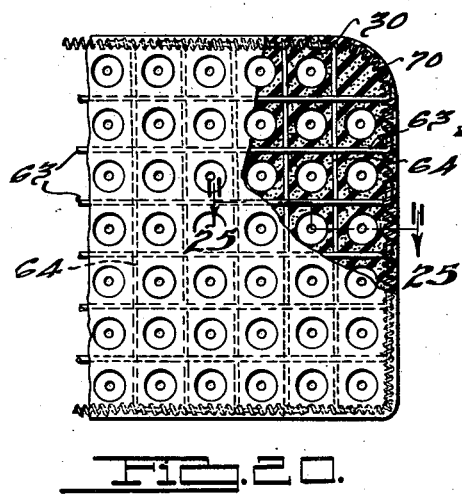
FIG. 20.
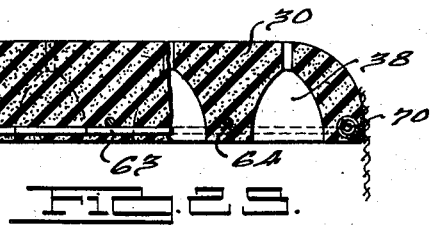
FIG. 25.
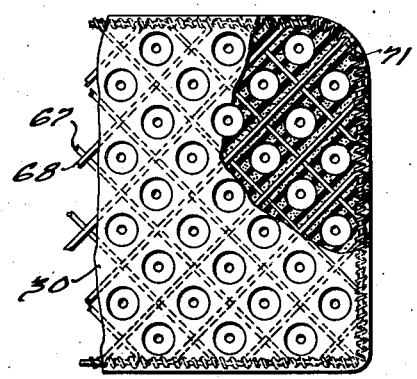
FIG. 22.
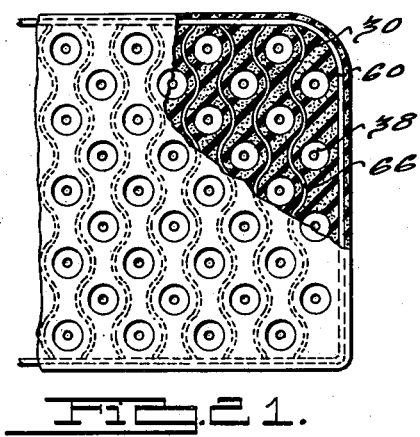
FIG. 21.
INVENTOR
Leonard A. Young.
BY Dike, Calvert & Gray
ATTORNEYS.

Patented May 12, 1942

2,283,116

UNITED STATES PATENT OFFICE 2,283,116

SEAT CUSHION

Leonard A. Young, Detroit, Mich.

Application December 4, 1939, Serial No. 307,357

5 Claims. (Cl. 155—179)

The present invention relates to a seat cushion and more particularly to a resilient seat cushion of the so-called spring-filled type which is particularly but not exclusively adapted for use in providing the resilient cushion elements used in vehicle seat constructions.

It is a principal object of the present invention to provide a seat cushion of the spring-filled type in which a compressible rubber top pad is secured to the resilient spring unit and in which provision is made for ventilating the top surface thereof.

Another object of the invention is to provide a seat cushion of the resilient spring-filled type in which a compressible rubber pad is utilized on the top thereof and provision is made for ventilating the pad to dissipate the heat absorbed thereby and to provide a circulating layer of air between the body of the user and said compressible rubber pad.

A further object of the invention is to provide a cushion construction of the resilient spring-filled type in which the advantages of riding comfort, durability and economy of the resilient spring-filled cushion are retained and in which the advantages of the compressible rubber type of seat cushion are present in the top pad which is secured to the resilient spring base forming a part of the seat assembly.

A still further object of the invention is to provide a seat cushion of the resilient spring-filled type which may be readily upholstered and trimmed, which has a long life in service, and which possesses economies in manufacture over the construction of conventional seats designed to provide comparable comfort to the user.

Other objects and advantages of this invention will appear in the following description and appended claims, reference being had to the accompanying drawings forming a part of this specification wherein like reference characters designate corresponding parts in the several views. In the drawings:

Fig. 1 is a view in perspective of a finished seat cushion showing one embodiment of the present invention;

Fig. 2 is an enlarged sectional view taken substantially on the line 2—2 of Fig. 1 in the direction of the arrows;

Fig. 3 is an enlarged fragmentary section taken substantially on the line 3—3 of Fig. 1 in the direction of the arrows;

Fig. 4 is a view in perspective of an insulator pad forming a part of one embodiment of the present invention;

Fig. 5 is an enlarged fragmentary section taken substantially on the line 5—5 of Fig. 4;

Figs. 6 and 7 are views similar to Fig. 5 but showing modified forms of construction of the insulator pad;

Fig. 8 is an enlarged fragmentary section showing a modified form of spring units incorporated in the cushion embodying the present invention;

Figs. 9, 10 and 11 are sectional views similar to Fig. 3 but showing other modifications of the seat cushion construction embodying the present invention;

Fig. 12 is a sectional view taken substantially on the line 12—12 of Fig. 11 in the direction of the arrows;

Figs. 19, 20, 21 and 22 are fragmentary bottom plan views, with parts broken away and partially in section, of other modified forms of construction of a seat cushion embodying the present invention;

Fig. 23 is an enlarged fragmentary section taken substantially on the line 23—23 of Fig. 19 in the direction of the arrows;

Fig. 24 is a view similar to Fig. 23 but showing a further modified form of a seat cushion embodying the present invention; and Fig. 25 is a fragmentary staggered section taken substantially on the line 25—25 of Fig. 20 in the direction of the arrows.

Figure 13:
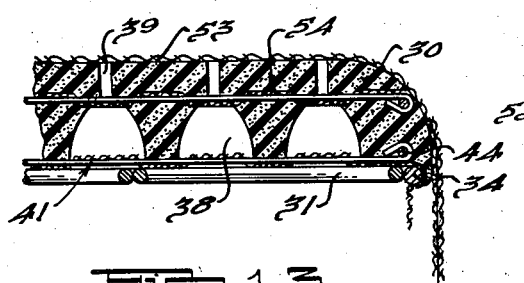
Figs. 13, 14, 15 and 16 are sectional views similar to Fig. 3 but illustrating other modifications of construction of a seat cushion embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Seat cushions embodying the present invention may be utilized wherever a resilient cushion member is desired to provide for the comfort of the user. Such units are commonly employed in the upholstered seats of vehicles, such for example as motor vehicles, railway trains, and the like, and may also be used in connection with upholstered furniture, mattresses, and the like. A resilient cushion construction when so used should be readily compressible to conform readily to the contours of the body of the user and at the same time must possess sufficient resiliency to absorb the shocks, strains and impacts imposed thereon and to cushion or deaden the shock resulting therefrom which would otherwise be transmitted to the user.

Seat cushions of the resilient spring-filled type have heretofore been used in large numbers and have been very satisfactory in absorbing and cushioning shocks and impacts which otherwise would be transmitted to the user. Difficulty has been experienced, however, in providing in such units a sufficient compressibility that the unit will readily conform to the body contours of the user and will at the same time have sufficient resiliency to withstand the loads and impacts to which they are subjected.

In an attempt to provide for the ready compressibility of the units so as to conform readily to the body contours of the user and also to dampen out and absorb minor shocks and impacts, attempts have been made to form such cushion units of readily compressible materials such as sponge rubber, or the like, which while being readily compressible, have a certain degree of resiliency. Such cushion units, while desirable from the standpoint of the ready compressibility and ready conformability of the unit to the body contours of the user, have prevented adequate ventilation of the units and much discomfort to the users has resulted therefrom. In addition, the units when so constructed do not have a sufficient degree of resiliency to provide for adequate cushioning of the loads thereon due particularly to sudden shocks and impacts unless the entire body of the material is so formed and is of such a resilient nature that much of its value as a readily compressible substance is lost. In addition, much difficulty is experienced in securing a proper trimming or upholstering of a seat cushion which is formed entirely of a readily compressible substance, such for example as sponge rubber.

A seat cushion embodying the present invention and as shown in the various figures of the drawings forming a part hereof, is designed to utilize the desirable features of a readily compressible substance such, for example, as sponge rubber, while also utilizing the desirable features of a seat cushion constructed of resilient spring units. The cushion thus is in effect a two-part cushion, the upper part being formed of a readily compressible material such, for example, as sponge rubber, and the lower part being formed of a plurality of resilient spring units.

The resilient cushion of the present invention as shown in Fig. 2, comprises a top pad 30 of a readily compressible material, such for example as sponge rubber, which is secured to a spring base which comprises a plurality of coil springs 31 which are connected together at their bottoms by a marginal frame member 32 and cross connecting members 33. The top portion of the spring units 31 are connected with the marginal wire 34 and the adjacent top edges of the springs are joined by the spring clip members 35. A covering 36 of suitable upholstery material such, for example, as fabric, leather, or the like, is secured to the bottom of the spring-filled unit and extends over the top of the sponge rubber pad 30. The interior of the cushion is ventilated by air which flows inside the spring-filled base portion of the cushion. The air is discharged through air cells 38 and air ducts 39 which communicate with the top surface of the pad 30. The flow of air currents through the cushion construction is indicated by the arrows shown in Fig. 2. A layer of flexible perforate material 40 is preferably secured to the top surface of the sponge rubber pad 30.

The sponge rubber pad 30 may be secured to the top of the spring base in various ways. It is desirable that this be done in such a manner that the base portion of the pad 30 is reinforced and only the reinforced portions thereof are secured to the spring unit. In the construction shown in Fig. 2, this is accomplished by the provision of an insulator pad 41 which, as shown in Figs. 4 and 5, in a preferred embodiment comprises a strip of fabric 42 such for example as burlap, or the like, through which is woven a plurality of resilient cross wires 43, the ends of which are secured to a frame member 44. Such a construction permits a ready uniting of the pad 30 with the top of the spring units 31, as for example by the clip 45 which extends through the body of compressible material forming the pad 30 and extends over the member 44 and through the fabric 42. When bent into the position shown in Fig. 3, the clip 45 engages the top of a spring unit 31 and the top border wire 34 of the spring base, and thus securely anchors the resilient pad to the spring base without impairing the compressibility of the pad and without affecting the resiliency of the spring base.

In the construction shown in Figs. 2 and 3, the wire members 43 are designed to run from the front to the rear of the cushion and thus to provide an additional resilient member for transmitting loads imposed on the cushion to all of the resilient spring elements in the spring base thereof. While this placement of the spring members is preferred, it is to be understood that the spring wire members 44 may run from side to side of the cushion, as shown for example in Fig. 8, wherein the wires are designated by the numeral 43a.

Various methods may be used for joining the wires 43 with the fabric 42 of the insulator pad. One such modification is shown in Fig. 6. In this instance the wires 43 are joined to the fabric 42 by a layer of latex or similar adhesive material 46 which extends through the coarse mesh of the cloth 42 and completely covers the wires 43. A further modified form of insulator pad is that shown in Fig. 7 and in which the wires 43 are joined with the fabric 42 by means of tape or similar material 47 which may be secured as by adhesives, riveting, sewing, or the like, to the fabric sheet 42. It is to be understood that the particular construction of the insulator pad is not per se part of the present invention and that therefore these and other modifications of the construction of this member may be used within the scope of the present invention.

A modified form of cushion construction embodying the present invention is shown in Fig. 8. This cushion unit is similar to the cushion unit shown in Fig. 2 except that the resilient spring units which are here designated by the numeral 31a are of a different type of construction which is known in the art as the "Marshall" type. In such a construction each of the resilient spring members is enclosed in a separate fabric pocket. The tops and bottoms of the springs are joined to form the spring unit by connecting means which extend through the fabric pockets. The construction of the pad 30 is the same as that previously discussed in connection with Fig. 2.

In Fig. 9 there is shown a section of a modified form of cushion construction embodying the present invention in which a pad 50 formed of fiber or the like is secured to the top of the compressible pad 30. When the cushion of the present invention is utilized for certain purposes it is desirable to provide a relatively thick covering on top of the resilient pad 30 and this is satisfactorily accomplished by the construction shown in Fig. 9. For other uses it is satisfactory to provide a covering for the resilient pad 30 which is relatively less thick than the fiber pad 50 shown in Fig. 9, and in this instance a layer of loosely woven burlap or similar fabric 51 may be provided as shown in Fig. 10.

In certain uses of the cushion embodying the present invention it is desirable to provide less compressibility and an additional resiliency in the top surface of the pad 30. This may be satisfactorily accomplished by the construction shown in Figs. 11 and 12 and in which an insulator pad construction 52 similar in construction to the insulator pad 41 previously discussed, is employed and is embedded in the top surface of the compressible pad 30. Such a construction will provide for a resilient transmission of loads imposed on the top surface of the pad 30 to a larger area of the pad 30 than where some non-resilient but flexible material is employed for covering the pad 30. It is to be understood, of course, that by so increasing the resiliency of the pad, some of the advantages of its ready compressibility may be lost. In certain instances as, for example, in bus seat constructions, or the like, the cushion is subjected to extremely hard use and while the comfort of the user is important, some of the comfort is sacrificed for a longer service life of the cushion. In all such uses the construction shown in Figs. 11 and 12 is recommended.

Figure 14:
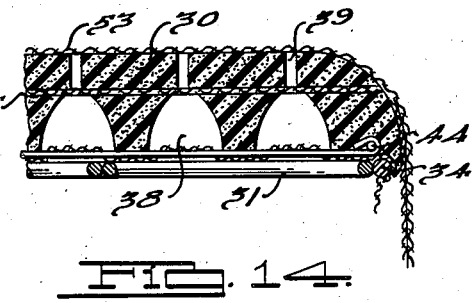

A modified form of the construction shown in Figs. 11 and 12 is shown in Fig. 13. In this instance the compressible pad 30 is covered with a fabric covering 53 and a reinforcing insulator pad 54 is molded into the body of the pad 30 in such a manner that additional rigidity is imparted to the pad but a surface layer of the unreinforced compressible material is disposed above the pad 54. This construction is desirable in providing a reinforced pad construction which still preserves the ready compressibility of a portion of the material forming the pad 30. A similar pad may be provided as shown in Fig. 14 and in which the insulator strip 54 of Fig. 13 is eliminated and a reinforcing strip of fabric 55, such as loosely woven burlap, is substituted therefor.

Figure 15:
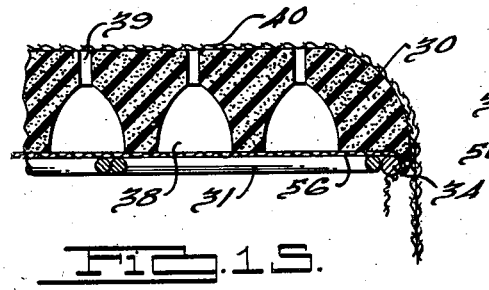
Figure 17:
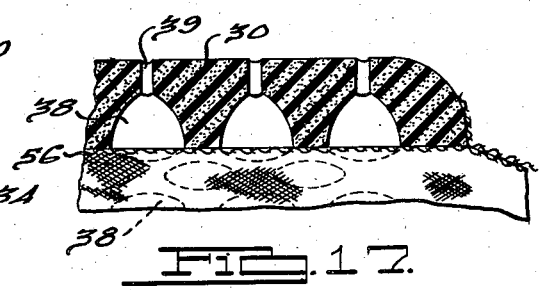
Fig. 17 is a fragmentary view, partially in section, showing a portion of the bottom of the pad shown in Fig. 15.
Figure 16:
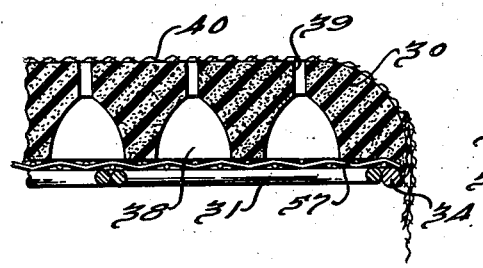
Figure 18:
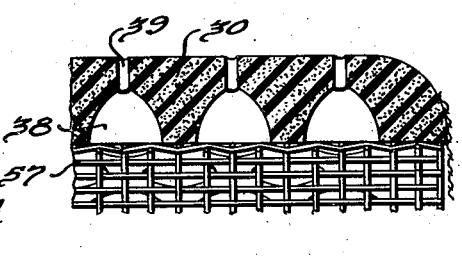
Fig. 18 is a fragmentary view, partially in section, showing a portion of the bottom of the pad shown in Fig. 16.

In the modified forms of cushions embodying the present invention shown in Figs. 15 to 18, inclusive, there is shown the compressible pad construction 30 which is provided in Figs. 15 and 17 with a body layer of fabric 56 such, for example, as loosely woven burlap, or the like, and the wire reinforced insulator pad of the previously discussed constructions is eliminated. In certain uses as, for example, in furniture construction, or the like, such a fabric strip has been found to possess sufficient strength to be satisfactory for the purpose. In Figs. 16 and 18 the bottom of the resilient pad 30 is secured to a coarse mesh screen 57 formed of resilient wires.

In the construction shown in Figs. 19 to 25, inclusive, the resilient pad 30 is provided with a bottom reinforcing member which consists of a marginal frame member 60 to which is secured a plurality of cross wires. In the construction shown in Fig. 19, the cross wires 61 extend from the front to the back of the cushion and the ends are secured to the marginal frame 60. In this embodiment as here shown and as shown in the sectional view of Fig. 23, the wires 61 are embedded in the body of the cushion member 30 at points intermediate the air cells 38. In the modified form shown in section in Fig. 24, the bottom portion of the cushion is further reinforced by the provision of a covering 62 formed of fabric or similar materials.

In the modified form shown in Fig. 20, the pad 30 is reinforced by the cross wires 63 which extend lengthwise of the cushion and the cross wires 64 which extend crosswise of the cushion and which cross the wires 63 substantially at right angles. The ends of the wires 63 and 64 in this instance are secured to a marginal frame 70 formed of a coiled spring member united at its ends.

As shown in Fig. 25, the entire reinforcing unit is embedded in the body of the material forming the cushion 30. As is apparent from an inspection of Fig. 20, it will be seen that the wires 63 and 64 are so placed relative to the air cells 38 that the air cells are unobstructed by the said wires and the wires are disposed entirely in the material between adjacent cells. In the modified construction shown in Fig. 21, the reinforcing wires are similar in placement and operation to the wires 61 shown in Fig. 19, but in this instance the cross wires 66 are serpentine in form and extend around the air cells 38 provided in the pad 30.

The modified form of construction shown in Fig. 22 is similar to that shown in Fig. 20 except that the cross wires 67 and 68 extend diagonally of the cushion construction. The cross wires 67 and 68 are secured to a frame 71 formed of a coiled spring member united at its ends. The use of the coil spring frame members 70 and 71 eliminates any tendency of the cushion to bind as would be likely to be the case if the frame members 70 and 71 were formed of a less yielding material. As is apparent from a consideration of the construction of Figs. 20, 22 and 25, the cross wires tend to stiffen the frame construction and if a relatively unyielding wire member is used as the marginal rim or frame, the entire base is rendered substantially rigid. This is eliminated by the use of the readily yielding coiled spring marginal frames 70 and 71 here shown.

From the foregoing it will be observed that I have disclosed herein a large number of different types of compressible pad constructions. It is to be observed, however, that all of such pad constructions possess in common the following characteristics:

(1) The provision of means for ventilating the pad.

(2) The stabilizing and reinforcing of the bottom portion of the pad and likewise increasing its resiliency by providing it with resilient wire strips or members.

(3) The provision of a suitable means for anchoring or securing the compressible top pad to the spring base.

(4) The provision of means incorporated in the pad and resiliently transmitting loads from the pad to the spring portion of the cushion.

The compressible pad 30 of the present invention may be formed in any desired conventional manner. In a preferred method the top fabric, if used, and the bottom reinforcing member, whether of the insulator pad type of construction or the reinforcing wire type of construction here shown, are placed in the molds and the sponge rubber is secured thereto by vulcanization at the same time that the pad is cured in the molds. Such a method lends itself readily to large scale commercial production of such units and assures a uniform uniting of the compressible material of the pad 30 with the reinforcing material which is incorporated therein. It is to be understood that all of the compressible pads 30 shown herein are intended to be united with a suitable spring cushion, such for example as that shown in Fig. 2 or that shown in Fig. 8, and that the present invention contemplates that the pads be so utilized.

As will be seen from a consideration of the construction shown in Fig. 2, the section of such a cushion when completed and upholstered is similar to that of a spring bellows. As the springs are compressed due to loads imposed thereon, air is forced out of the cushion through the cells 38 and ducts 39 and provides a ventilation of the top surface of the pad 30. When the load is lessened the springs tend to expand and in so expanding draw air inwardly through the open bottom of the cushion.

While I have here disclosed a cushion construction which is of the non-reversible type in that the pad 30 is provided on one surface only of the cushion, it is to be understood that the pad 30 may be placed on both surfaces of the cushion and thus provide a cushion construction of the reversible type if desired.

I claim:

1. In a seat cushion structure including a spring base member and a compressible rubber pad adapted to be secured thereto, in which said pad is provided with a plurality of air cells and ducts communicating between said cells and the top surface of said pad, means for stabilizing the bottom portion of said pad and increasing the resiliency thereof, said means comprising resilient wire strips molded in said pad adjacent the bottom thereof and having their end portions connected to a marginal frame member, and means for securing said marginal frame member to the top portion of said spring base member.

2. In a seat cushion structure including a spring base member and a compressible rubber pad adapted to be secured thereto, in which said pad is provided with a plurality of air cells and ducts communicating between said cells and the top surface of said pad, means for stabilizing the bottom portion of said pad and increasing the resiliency thereof, said means comprising resilient wire strips molded in said pad adjacent the bottom thereof and having their end portions connected to a marginal frame member, and means for securing said marginal frame member to the top portion of said spring base member, 65 said resilient wire strips being completely embedded in said pad and so formed and placed therein that said air cells and ducts are unobstructed thereby.

3. In a seat cushion structure including a spring base member, a compressible rubber pad adapted to be secured thereto, in which said pad is provided with a plurality of air cells and ducts communicating between said cells and the top surface of said pad, and a covering for said pad comprising a loosely woven fabric material secured to said pad and extending over the top surface thereof; means for stabilizing the bottom portion of said pad and increasing the resiliency thereof, said means comprising resilient wire strips molded in said pad adjacent the bottom thereof and having their end portions connected to a marginal frame member, means for securing said marginal frame member to the top portion of said spring base member, said resilient wire strips being completely embedded in said pad and so formed and placed therein that said air cells and ducts are unobstructed thereby.

4. In a seat cushion structure including a spring base member, a compressible rubber pad adapted to be secured thereto, in which said pad is provided with a plurality of air cells and ducts communicating between said cells and the top surface of said pad, and a covering for said pad comprising a loosely woven fabric material secured to said pad and extending over the top surface thereof; means for stabilizing the bottom portion of said pad and increasing the resiliency thereof, said means comprising resilient wire strips molded in said pad adjacent the bottom thereof and having their end portions connected to a marginal frame member, means for securing said marginal frame member to the top portion of said spring base member, said resilient wire strips extending both transversely and laterally of the said cushion and having their ends secured to a yieldable marginal frame, said wire strips and said frame being completely embedded in said pad and so formed and placed therein that said air cells and ducts are unobstructed thereby.

5. In a seat cushion structure including a spring base member, a compressible rubber pad adapted to be secured thereto, in which said pad is provided with a plurality of air cells and ducts communicating between said cells and the top surface of said pad, and a covering for said pad comprising a loosely woven fabric material secured to said pad and extending over the top surface thereof; means for stabilizing the bottom portion of said pad and increasing the resiliency thereof, said means comprising resilient wire strips molded in said pad adjacent the bottom thereof and having their end portions connected to a marginal frame member comprising a coiled spring member having its ends connected to form an endless yieldable frame, means for securing said marginal frame member to the top portion of said spring base member, said resilient wire strips being completely embedded in said pad and so formed and placed therein that said air cells and ducts are unobstructed thereby.

LEONARD A. YOUNG.